United States Patent Office 3,044,579
Patented July 17, 1962

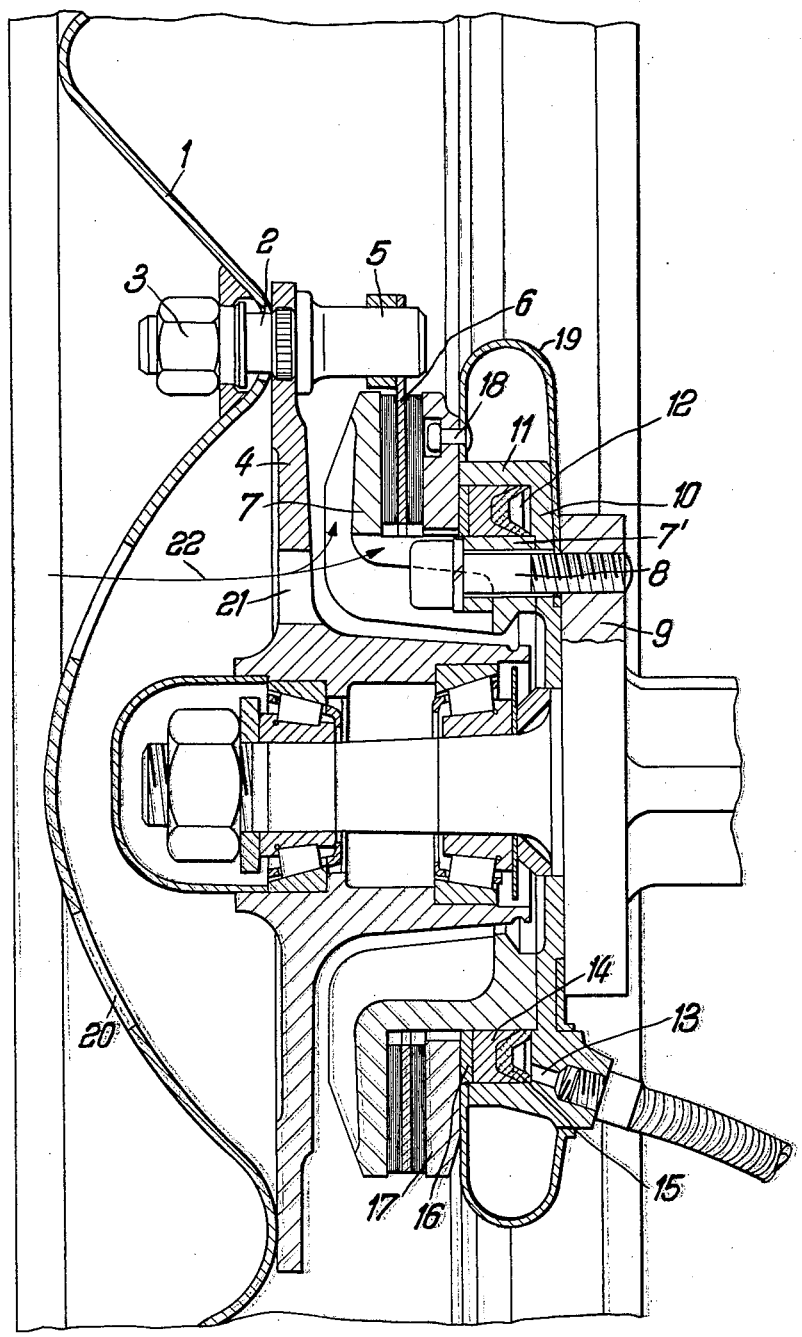

3,044,579
DISC BRAKES, MORE PARTICULARLY FOR MOTOR VEHICLES
Hermann Klaue, Christophstr. 19, Uberlingen (Bodensee), Germany
Filed Oct. 26, 1959, Ser. No. 848,662
Claims priority, application Germany Oct. 29, 1958
5 Claims. (Cl. 188—72)

Disc brakes are known which consist of a stationary brake housing and one or more brake discs which are provided with brake linings, are mounted for free axial movement and rotate with the wheel axle and which are urged against the brake housing by means of a hydraulic, pneumatic and/or mechanically actuated device, against the force of a spring which restores the pressure plate of the brake housing to its neutral position.

The invention relates to such disc brakes. Its object is to develop further the type of brake construction characterised in the sense that it requires less space, is easier to manufacture and encasing of the pneumatic or hydraulic actuation members is effected.

According to the invention, the solution of this problem consists in that the pressure plate of the ribbed brake housing secured to the axle assembly and open towards its outer periphery is secured to an annular U-section spring which is so curved and gripped between the brake housing and the axle that it seals off the hydraulic or pneumatic actuating device from the outside and transfers at least some of the brake heat and the whole of the torque from the pressure plate to the axle body.

The brake discs penetrating into the brake housing from above are suspended for axial displacement, in a manner known per se, by their outer periphery, from axial extensions of the studs connecting the body of the wheel to the rotating wheel hub, which extensions face the interior of the wheel. The annular cylinder of the hydraulically or pneumatically actuated brake-actuating device is formed by the cylindrical collar of the brake ring and the flange portion of the brake housing. A heat-insulating ring is provided between the annular piston of the aforesaid device and the presssure plate.

One embodiment is illustrated by way of example in the drawing. The body 1 of the wheel is secured by means of the studs 2 with the hub nuts 3 to the rotating hub 4. The studs 2 comprise extensions 5 which project axially into the interior of the wheel and on which the rotating brake disc 6 provided with brake lining on both sides is suspended for free axial movement. The brake housing 7 is open towards its outer periphery and engages round the brake disc 6. The housing 7 is secured to the axle body 9 of the vehicle by means of bolts 8.

The brake ring 10, which is gripped between the brake housing and the body part 9 of the axle, together with its cylindrical extension 11 and the flange portion 7' of the brake housing 7, forms the oil-pressure chamber 12 of the annular cylinder, to which pressure oil is supplied through a conduit 13. Mounted in this chamber is a piston ring 14 which is sealed off from the outside by a packing ring 15. During the braking operation, the piston ring 14 is urged against the pressure plate 17 through a heat insulating disc 16.

The pressure plate 17 is secured by means of rivets 18 to a U-section spring 19, which is of double-U-shaped cross-section and which is gripped between the brake ring 10 and the body part 9 of the axle, likewise by means of the bolt 8. This U-section spring is compressed in such a manner that it always tends to move the pressure plate 17 in opposition to the direction of actuation during the braking operation. Thus it effects the return of the pressure plate 17 to its neutral position after termination of the braking operation. This neutral position is shown in the drawing. Since the clearance between the brake lining of the brake disc and the pressure plate only amounts to 1/10 mm. in this position, the air gap cannot be illustrated in the drawing. The U-section spring 19 transmits the torque from the axle body 9 of the vehicle to the pressure plate 17 and conducts the brake heat to the atmosphere through its large surface exposed to the airstream during travel. Apertures 20 in the body 1 of the wheel and bores 21 in the hub 4 serve to conduct the brake heat from the brake housing 7. The path of the cooling air from the outside of the body 1 of the wheel to the brake housing 7 is indicated by the arrow 22.

I claim:
1. A disc brake comprising a stationary brake housing, at least one brake disc provided with a brake lining and mounted for free axial movement and for rotation with the wheel axle assembly, brake actuating means for urging said disc against the brake housing, a pressure plate, and an annular U-section spring for restoring the pressure plate to its neutral position, said spring being secured to said pressure plate and being curved and gripped between the brake housing and the axle body to seal off the brake actuating means from the outside and transfer at least some of the brake heat and all the torque from the pressure plate to the axle body, said brake actuating means including a hydraulically actuated device comprising an annular cylinder with an annular piston therein, said cylinder being formed by a cylindrical extension of a brake ring and by a flange portion of the brake housing, a heat insulating ring being arranged between said annular piston and the pressure plate.

2. A disc brake, for use with a vehicle having a body and a wheel, comprising a stationary brake housing open along the outer periphery and connected to said body, at least one brake disc, means connected to said wheel mounting said brake disc to be freely movable axially of, and rotatable with, the wheel, brake lining means disposed between said brake housing and brake disc, brake actuating means operable for urging said brake disc against the brake housing including a pressure plate disposed outside the brake housing and exposed to be air cooled and being movable between an inoperative position and, respectively, an operative braking position wherein said pressure plate engages said brake disc to press the brake disc against the brake housing, brake operating means actuatable to move said plate to said operative braking position, and an annular U-section spring operable for retracting the pressure plate to its inoperative position, said spring being secured between the brake housing and said body and having a curved portion disposed externally of the brake housing and exposed to be air cooled and surmounting the brake actuating means for the sealing thereof from the outside, said pressure plate being secured to the curved portion so that the spring suspends the pressure plate and urges the pressure plate into the inoperative position, transfers some of the brake heat from the pressure plate and transfers the braking torque from the pressure plate to said body.

3. A disc brake, as claimed in claim 2, a rotating hub mounted on said body, said brake disc extending into the brake housing from the outside and being axially displaceable, said means mounting said brake disc comprising a series of studs connecting said wheel to said hub and extending inwardly of said hub axially for a portion, said brake disc being suspended on the inwardly extending portions of said studs and being axially guided thereby.

4. A disc brake as claimed in claim 2, wherein the brake actuating means is a hydraulically actuated device.

5. A disc brake as claimed in claim 2, wherein the brake actuating means is a pneumatically actuated device.

References Cited in the file of this patent

UNITED STATES PATENTS

| 2,099,489 | Lambert | Nov. 16, 1937 |
| 2,303,710 | Sinclair | Dec. 1, 1942 |

FOREIGN PATENTS

| 1,169,892 | France | Sept. 15, 1958 |
| 373,592 | Great Britain | Nov. 20, 1930 |